(12) United States Patent
Starkey et al.

(10) Patent No.: US 7,963,758 B2
(45) Date of Patent: Jun. 21, 2011

(54) EXTERNAL PLATE LOCKS FOR MOLD PLATES

(75) Inventors: Glenn Starkey, Wauconda, IL (US); Kenneth Rumore, Wauconda, IL (US)

(73) Assignee: Progressive Components International Corporation, Wauconda, IL (US)

( * ) Notice: Subject to any disclaimer, the term of this patent is extended or adjusted under 35 U.S.C. 154(b) by 48 days.

(21) Appl. No.: 12/456,475

(22) Filed: Jun. 17, 2009

(65) Prior Publication Data

US 2010/0323054 A1 Dec. 23, 2010

(51) Int. Cl.
*B29C 33/22* (2006.01)

(52) U.S. Cl. ............... 425/190; 425/451.9; 425/595

(58) Field of Classification Search ............ 425/190, 425/451.9, 595
See application file for complete search history.

(56) References Cited

U.S. PATENT DOCUMENTS

| 3,004,291 | A | * | 10/1961 | Schad | 425/451.9 |
| 3,196,483 | A | * | 7/1965 | Eyles | 425/311 |
| 3,706,116 | A | * | 12/1972 | Drazick | 425/451.9 |
| 3,825,396 | A | * | 7/1974 | Kontz | 425/451.9 |
| 3,915,613 | A | * | 10/1975 | Ruch | 425/438 |
| 4,174,939 | A | * | 11/1979 | Fenner | 425/451.9 |
| 4,403,810 | A | | 9/1983 | Bieneck | |
| 4,828,478 | A | * | 5/1989 | Hehl | 425/190 |
| 5,494,435 | A | | 2/1996 | Vandenberg | |
| 5,540,582 | A | | 7/1996 | Catalanotti et al. | |
| 6,431,852 | B1 | | 8/2002 | Vandenberg | |
| 6,491,513 | B1 | | 12/2002 | Schneider | |
| 6,872,069 | B2 | | 3/2005 | Starkey | |
| 7,229,265 | B1 | * | 6/2007 | Lemkin | 425/190 |

FOREIGN PATENT DOCUMENTS

EP 0 894 606 A1 2/1999

OTHER PUBLICATIONS

STRACK® Normalien, STRACK® catalog, believed to be published at least as early as Jul. 2007 (31 pages).
www.MoldGizmo.com, "LCH-01 and AAC-01," Apr. 17, 2008 (9 pages).
U.S. Appl. No. 60/621,369, filed Oct. 23, 2004, Sukonik, "Sliding latch-lock" (not published) (11 pages).

* cited by examiner

*Primary Examiner* — James Mackey
(74) *Attorney, Agent, or Firm* — Pauley Peterson & Erickson

(57) ABSTRACT

A locking device for a mold including more than one movable plate. A spring-biased wedge block includes a first side wall and an opposing second side wall that is beveled with respect to the first side wall. A latch bar includes an inclined latch end for engaging with the second side wall of the wedge block. A cam bar includes a cam end for engaging with the first side wall of the wedge block. At least one of the wedge block, the latch bar or the cam bar is formed of a 4340 steel alloy, and at least one of the latch end, the cam end, or the wedge block second side wall is nitrided or nitride coated.

20 Claims, 6 Drawing Sheets

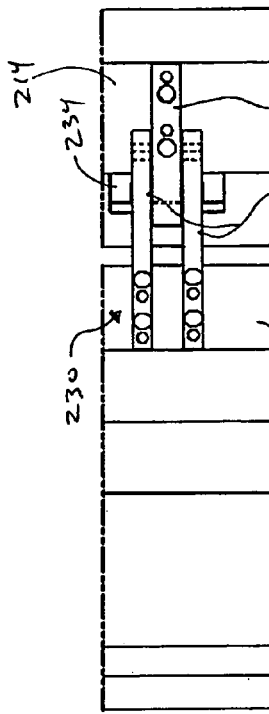
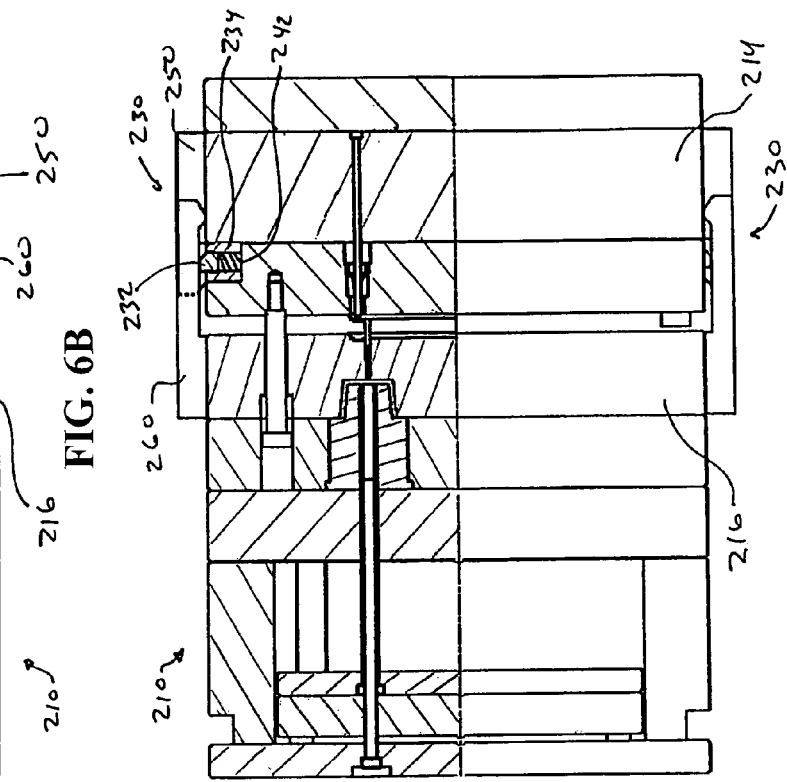
FIG. 5B
FIG. 5A
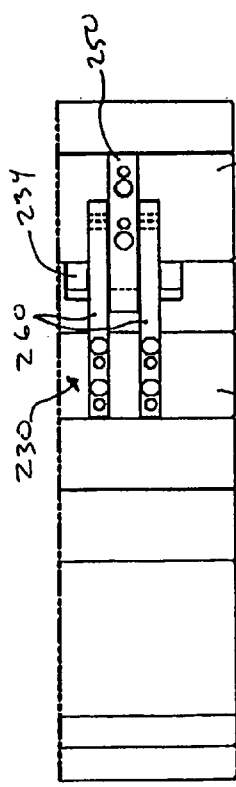
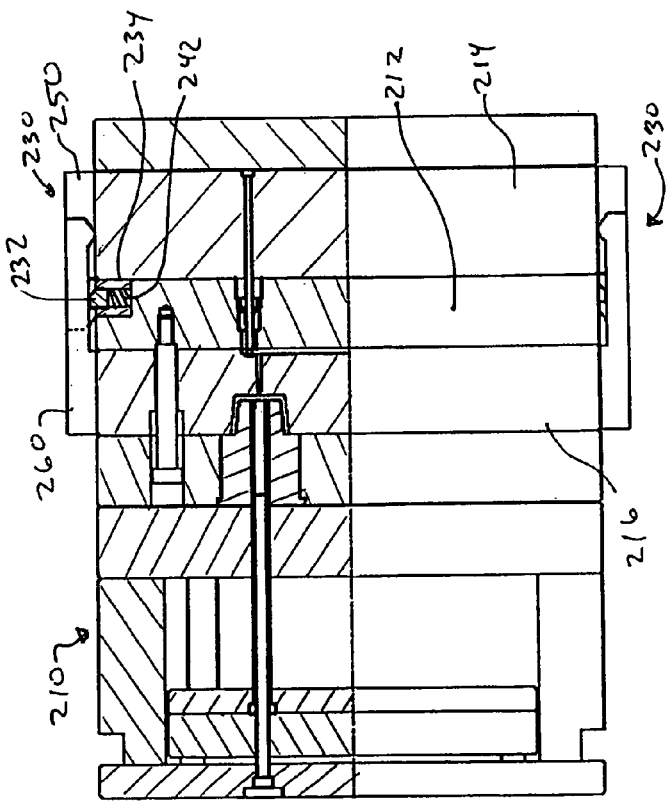
FIG. 6B
FIG. 6A

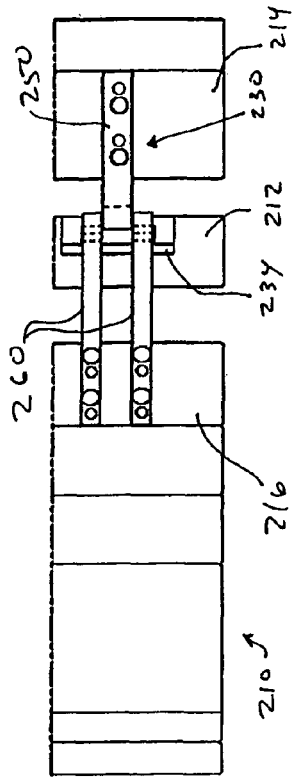
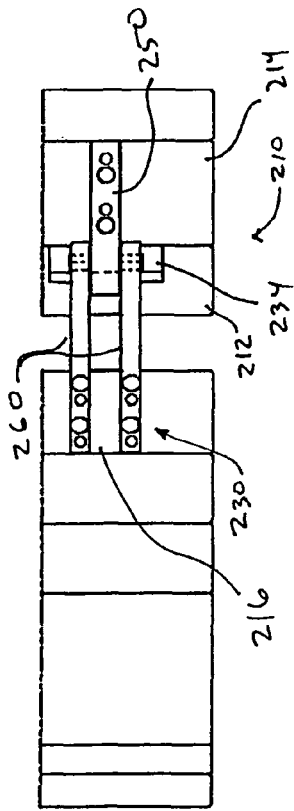
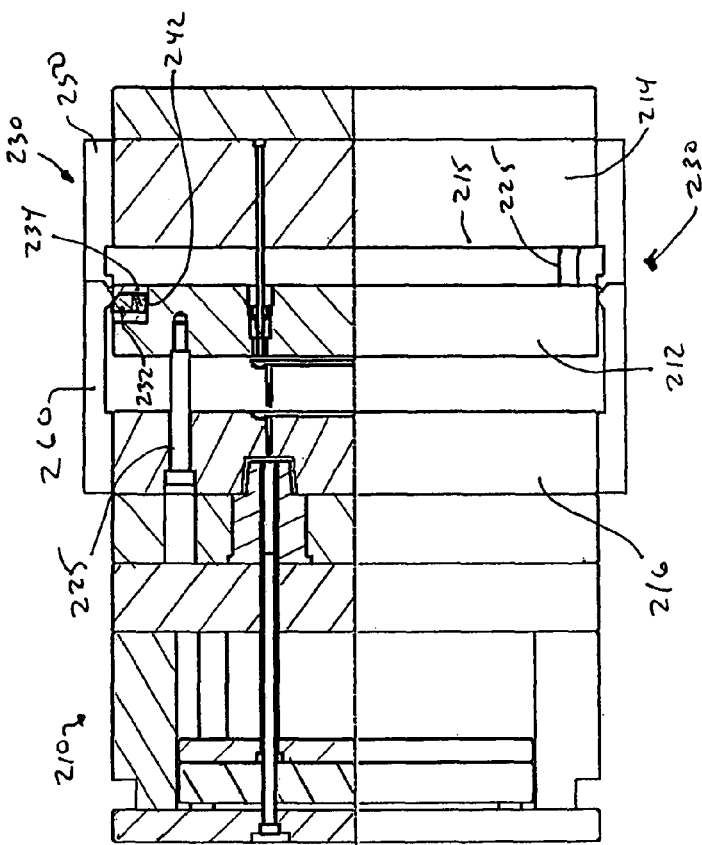
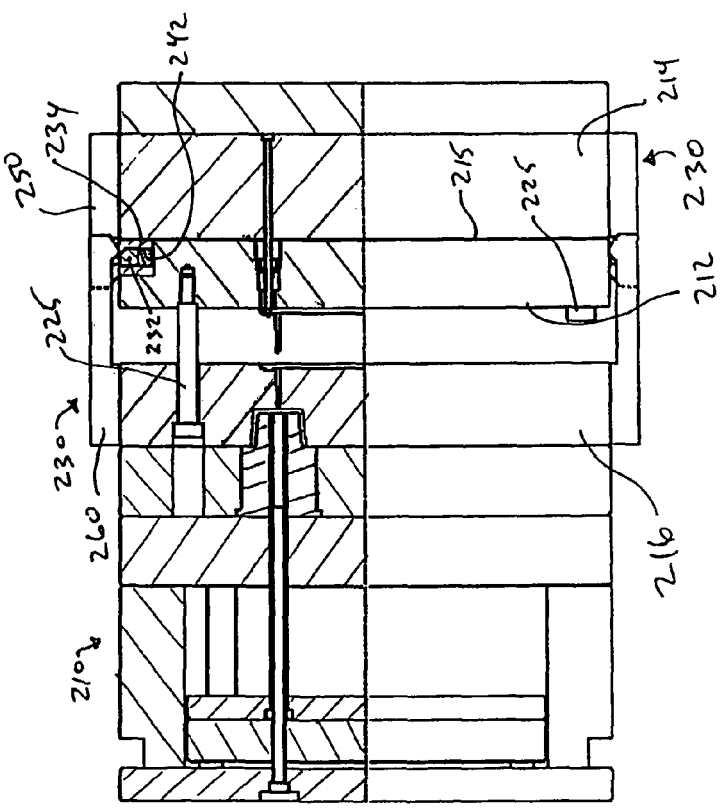
FIG. 7A
FIG. 7B
FIG. 8A
FIG. 8B

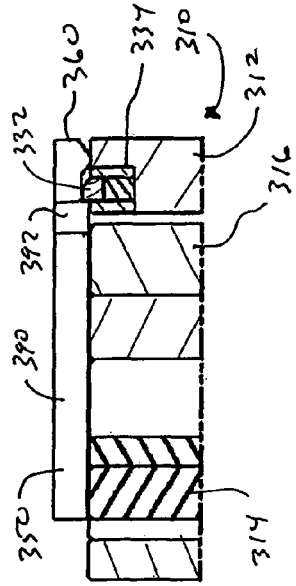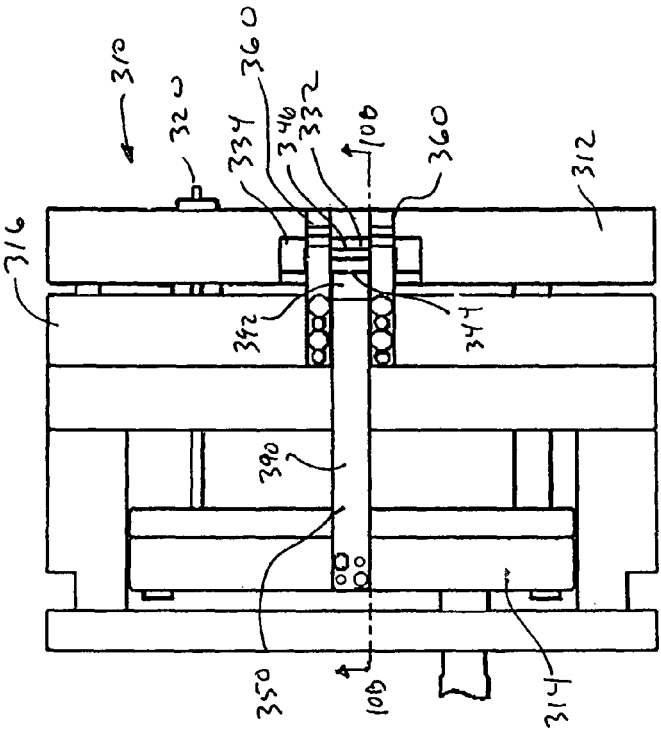
FIG. 9B
FIG. 9A
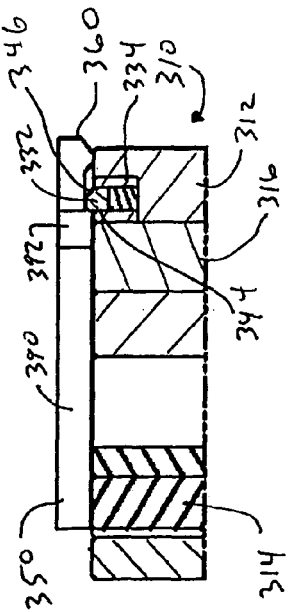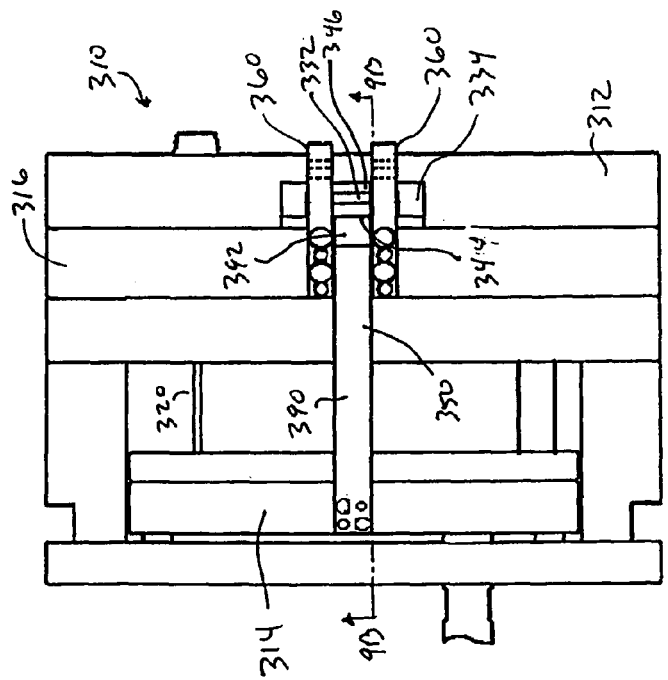
FIG. 10B
FIG. 10A

EXTERNAL PLATE LOCKS FOR MOLD PLATES

BACKGROUND OF THE INVENTION

This invention relates generally to coupling devices for controlling plate sequences in a mold where multiple parting lines are required, and more particularly to plate locks or latch locks for multi-plate molds.

Tripartite injection or compression molds, especially for forming of plastic pieces, incorporate a two-stage separation of plate components to facilitate the ejection of one or more pieces formed in a mold-closed position. Coupling devices are used to hold a second separation stage in a closed position until the first separation stage has reached a certain gap width. Upon reaching the desired gap width, the coupling device releases the second separation phase.

Currently, different mechanisms are used for such a coupling device. Common coupling devices include a locking bar fixed to one plate and secured to a movable element on a second plate. When the movable element is moved, the locking bar is released and the plates separate. Often coupling devices break during use because of the force put on the thin steel. It is not uncommon for end-users to modify parts of the coupling devices by adding extra material for strength even before the devices are installed within the molds. There is a continuing need for an improved coupling device.

SUMMARY OF THE INVENTION

The general object of the invention can be attained, at least in part, through a locking device for a mold including at least three plates. The locking device includes a biased wedge block that is movably mountable to a first of the plates. The wedge block includes a first side wall and an opposing second side wall that is beveled with respect to the first side wall. The locking device includes a latch bar that is fixedly mountable to a second of the plates. The latch bar includes a latch end for engaging with the second side wall of the wedge block. The locking device further includes a cam bar that is fixedly mountable to a third of the plates. The cam bar includes a cam end for engaging with the first side wall of the wedge block. At least one of the wedge block, the latch bar and the cam bar is formed of a steel alloy, and at least one of the latch end, the cam end, and the wedge block second side wall is nitrided or nitride coated.

The invention further comprehends a locking device that includes a biased wedge block, a cam bar, and a latch bar, for a mold including at least three plates. The wedge block is movably mountable to a first of the plates, and includes a first side wall and an opposing second side wall that is beveled with respect to the first side wall. The cam bar is fixedly mountable to a second of the plates, and includes a cam surface for engaging with the first side wall of the wedge block. The latch bar is fixedly mountable to a third of the plates, which is disposed between the first and second plates, and the latch bar includes an inclined latch surface for engaging with the second side wall of the wedge block.

The mold plate locking device of this invention incorporates an angled latch that causes moving locked plates to release from each other, thereby allowing for different plate traveling distances during a molding cycle. The locks of this invention can incorporate high-strength steels and treatments to help avoid premature failure during use, as well as angles on the bars that allow for a more smooth transition from one actuation to the next.

In addition, the invention provides a locking device for an ejector system, where a stripper plate strips the molded part and then the ejector system is used to knock-off the parts that stick to that same stripper plate. The present invention provides a locking device having a driver bar attached to the ejector system that pushes the stripper plate until a release position. At the release position, the ejector continues to remove the molded piece from the stripper plate. The driver bar can be provided as an attachment to the locking device, where a longer cam bar is replaced by the driver bar. The cap/driver assembly forming the cam bar can be rotated if wear occurs during the life of the product, with only screw mounting holes needing to be re-machined in the side 90° or 180° from the current plane being used for mounting holes.

The plate locks of this invention provide one design that is versatile enough for several applications including: 3-plate molds having three parting lines; stripper plate/ejection activation molds; and dual ejection molds. 3-plate molds are tools that often have three parting lines that require a runner to break from the part first, a sucker pin to break free from the runner second, and then finally a molding detail parting line that opens to allow the molded part and the runner to fall after being ejected. The plate locks of this invention can be used to hold the plates in position until each parting line is forced open by the proper actuation. Molds having stripper plate/ejection activation are tools that often have two parting lines, and a stripper plate is the first to open to break the seal around the molded part and move the part away from the core. Dual ejection molds are often used when the part design warrants the deepest cores to be ejected first followed by the entire part moving off of a second set of pins to fall from the mold. The plate locks of this invention can be installed on the ejector system and timed to accommodate the two stages.

Molds and mold components commonly used in current commercial molds are discussed in, for example, U.S. Pat. Nos. 5,540,582; 6,491,513; and 6,872,069, herein incorporated by reference for explanation of common mold components and operation.

DEFINITIONS

As used herein, references to "nitriding," are to be understood to refer to a process which introduces nitrogen, such as by heating in the presence of ammonia gas, in the surface of a material as, for example, a hardening treatment of the steel surface. "Nitrided" refers to a material having undergone a nitriding process.

As used herein, references to "black oxide" are to be understood to refer to black finish on a metal produced by immersing it in hot oxidizing salts or salt solutions.

Further, references herein to "nitride coating" are to be understood to refer to a process for coating a material with a metal nitride, such as by vapor deposition processes. "Nitride coated" refers to a material having undergone a nitride coating process.

Other objects and advantages will be apparent to those skilled in the art from the following detailed description taken in conjunction with the appended claims and drawings.

BRIEF DESCRIPTION OF THE DRAWINGS

FIGS. 5-8 show a locking device mounted on a side of a mold and in operation, according to another embodiment of this invention, with FIGS. 5A, 6A, 7A, and 8A each showing a partial sectional side view, and FIGS. 5B, 6B, 7B, and 8B each showing a corresponding partial top view.

FIGS. 9-12 show a locking device mounted on a side of a mold and in operation, according to another embodiment of this invention, with FIGS. 9A, 10A, 11A, and 12A each showing a top view, and FIGS. 9B, 10B, 11B, and 12B each showing a corresponding sectional side view.

DETAILED DESCRIPTION OF THE PREFERRED EMBODIMENTS

Figure 1:
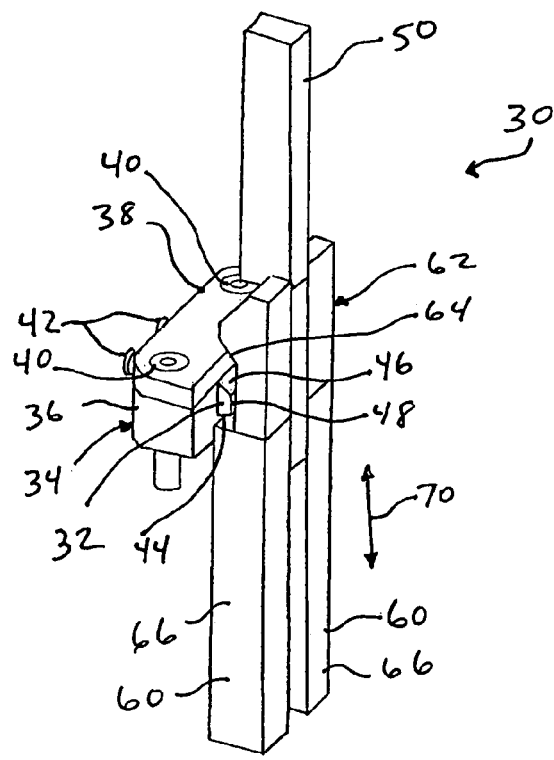
FIG. 1 is a locking device according to one embodiment of this invention.

FIG. 1 is a locking device according to one embodiment of this invention. The locking device 30 includes a wedge block 32 secured within, and extending from, a guide housing 34. The guide housing 34 includes a first guide housing portion 36 and a second guide housing portion 38 held together, and connectable to a mold plate, by fasteners 40. Fasteners 40 are desirably dowel pins, but can be other fasteners such as bolts or screws. Compression springs 42 extend from an opening in the guide housing 34, and when the guide housing 34 is attached to a mold plate, are compressed between the mold plate and the wedge block 32 to bias the wedge block toward a position extending from the housing 34.

The wedge block 32 includes a first side wall 44 extending at least substantially perpendicular from the guide housing 34. The wedge block 32 includes a second side wall 46 that is opposite the first side wall and that is beveled with respect to the first side wall 44. A wedge block top surface 48 extends between the top edge of each of the straight first side wall 44 and the angled second side wall 46.

The locking device 30 includes a cam bar 50 and two latch bars 60, each mountable to mold plates and positioned over the portion of the wedge block 32 extending from the guide housing 34. As shown in FIG. 1, the cam bar 50 is disposed between the two latch bars 60, but alternative configurations are also available depending on need. For example, a single latch bar can be disposed between two cam bars, or only one of each of the cam bar and latch bar can be used. The cam and latch bars can also vary in size and configuration depending on the particular mold device with which they will be used.

Each of the latch bars 60 includes a latch end 62 for engaging the beveled second side wall 46 of the wedge block 32. The latch end 62 includes an inclined latch surface 64 for engaging the second side wall 46. The latch surface 64 is desirably correspondingly angled to the second side wall 46 to facilitate the depression of the wedge block 32 when the inclined latch surface 64 contacts the second side wall 46 due to the movement of the latch bars 60 or the wedge block 34 in one of the directions indicated by arrow 70. The latch surface 64 can be parallel or coplanar with the second side wall 46, or can vary in angle slightly over a portion or an entirety of the surface 64 depending on need to facilitate function. Between the latch end 62 and a body 66 of the latch bars 60, the latch end 62 is narrowed to allow a spacing for the raised wedge block 32 to travel before being pushed downward by the latch surface 64.

Figure 2:
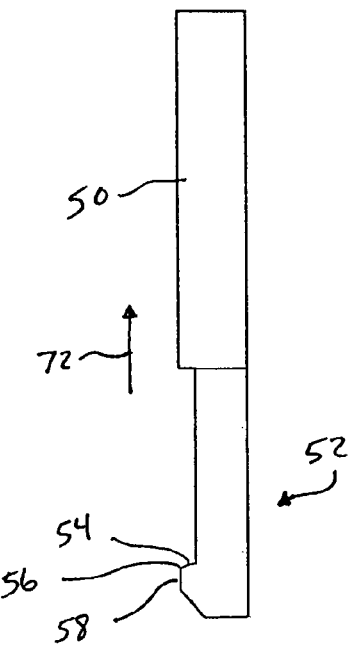
FIG. 2 is a cam bar for a locking device, according to the embodiment of the invention shown in FIG. 1.
Figure 3:
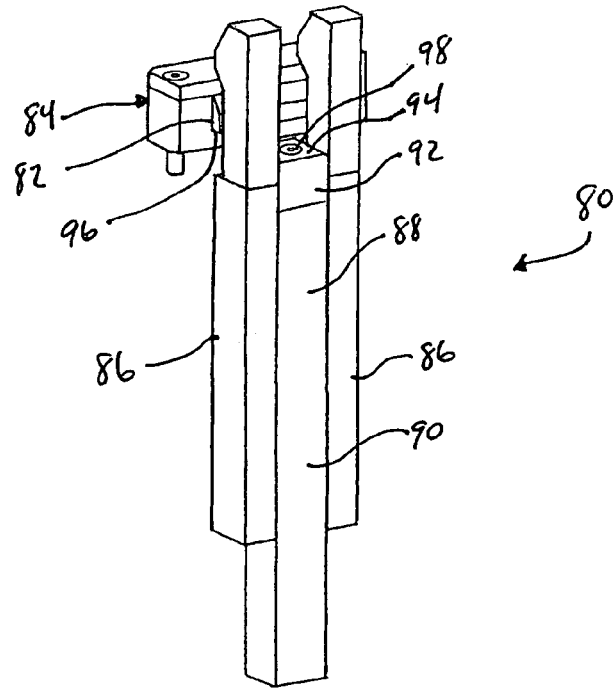
FIG. 3 is a locking device according to another embodiment of this invention.

FIG. 2 is a side view of the cam bar 50, removed from the locking device 30 for illustration purposes. The cam bar 50 includes a cam end 52 for engaging the first side wall 44 of the wedge block 32. The cam end 52 includes a cam surface 54 that contacts the first side wall 44, and when the cam bar 50 is traveling in the direction illustrated by arrow 72, acts upon the first side wall 44 to pull the wedge block 32 and the plate the wedge block 32 is mounted upon. In this manner, the cam bar 50 is used to hold two plates together, until the wedge block 32 is depressed by the latch bars 60 to release the cam bar 50.

In one embodiment of this invention, the cam surface 54 is at least approximately coplanar or parallel with the first side wall 44. In another embodiment of this invention, as shown in FIG. 2, the cam surface 54 is slightly tapered with respect to the first side wall 44. It has been discovered that by angling the cam surface 54, the wear on the upper corner of the cam surface 54 is reduced during engagement and release of the first side wall 44, as compared to when these two surfaces are at parallel 90° angles. Including a rounded transition 56 at the intersection between the cam surface 54 and the adjacent surface 58 provides additional wear resistance benefits. The tapered cam surface 54 and rounded corner transition 56 also provide a more measured and gradual release of the cam surface 54 from the wedge block 32. The first side wall 44 can also be tapered, or can remain in the at least substantially 90° angle to the guide housing 34 shown in FIG. 1.

The wedge block, the latch bar and/or the cam bars can be formed of a steel alloy. Various steels and steel alloys can be used to form these components, and one particularly preferred steel alloy includes nickel, chromium, and/or molybdenum, such as 4140 or 4340 steel alloy. In one embodiment of this invention, one or more of the latch ends, the cam end, and/or the wedge block second side wall is nitrided or nitride coated for additional wear resistance. In one particularly preferred embodiment, the latch bars 60 and the cam bar 50 are each made from 4340 material and are nitrided throughout. After the nitriding, the square portion of the bars below the latch end or cam end are ground to allow for ease of machining fastening screws and dowels in the area of these ground portions to suit a particular mold, leaving the latch or cam ends of these bars nitrided with a harder surface than the remaining body portions. Alternatively, this combination of working surfaces of high hardness combined with softer, machinable fastening locations can be achieved with 'masking' surfaces to limit the nitride surface location, or, constructing the bars with a two piece design. The latch or cam surfaces of these bars 'catch' on the wedge block, which is desirably nitride coated, providing lubricity and a strong surface, thereby reducing wear between the different parts. In one embodiment, titanium nitride coating is preferred, but other coatings such as chromium nitride coatings or boron nitride coatings can be used as well depending on need.

FIG. 2 is a locking device 80 according to another embodiment of this invention. The locking device includes a wedge block 82 in a guide housing 84, similar to or identical to the wedge block 32 and guide housing 34 described above. Two latch bar 86 are disposed on either side of a cam bar 88. The latch bars 86 are similar or identical to the latch bars 60 described above. The embodiment of FIG. 2 includes a differently configured cam bar 88, as compared to the embodiment of FIG. 1. Instead of pulling the wedge block as in the embodiment of FIG. 1, the cam bar 88 pushes the wedge block 82. The configuration of the locking device 80 is particularly useful in mold configurations having a stripper plate and/or an ejector system, as discussed further below.

The cam bar 88 is formed as a driver bar 90 having a removable cap 92 attached to the driver bar 90. The cap 92 includes the cam surface 94 for engaging and exerting force upon the first side wall 96 of the wedge block 82. The cap 92 is preferably separately formed and attached to the driver bar 90, such as by fastener 98, to allow for replacement of the cap 92 if needed due to eventual wear. The cap 92 can alternatively be integrally formed on the end of the driver bar 90. In one embodiment of this invention, both ends of the driver bar can accept the separately formed cap 92, thereby allowing the driver bar to be rotated and reinstalled to prolong the life of the driver bar 90.

The wedge block 88, the latch bars 86, and/or the cam bar 90 can be formed using any of the materials and treatments discussed above. In one embodiment of this invention, the driver bar is desirably formed from black oxided steel alloy, such as 4140 material. The cap 92 is desirably formed from steel alloy, such as 4340, and can optionally be nitrided or titanium nitride coated.

Figure 4A:
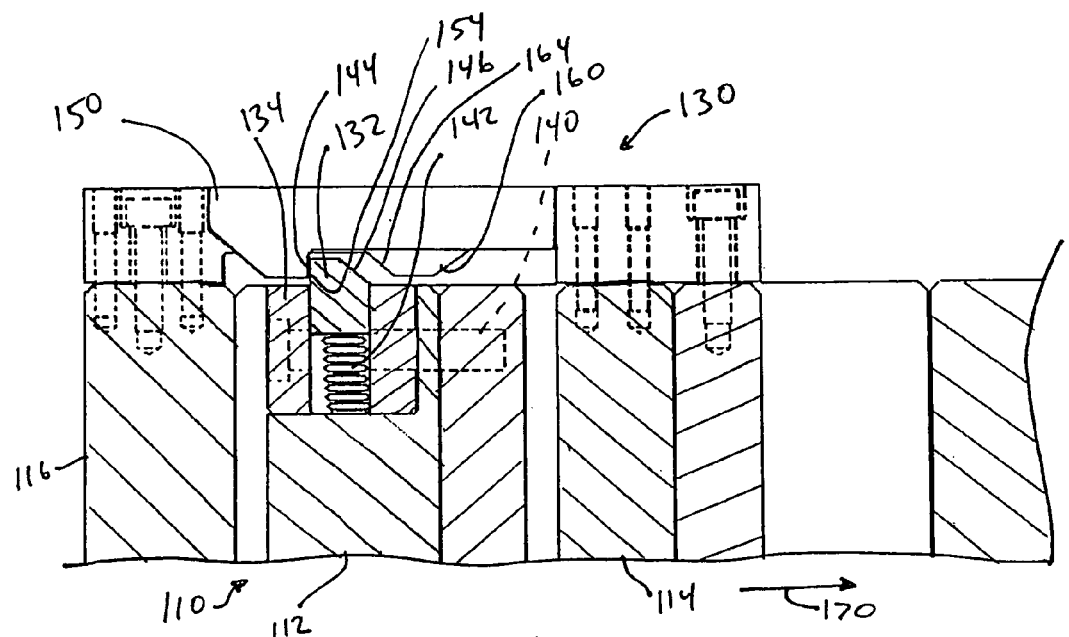
FIGS. 4A and 4B show a locking device mounted on a side of a mold and in operation, according to another embodiment of this invention.
Figure 4B:
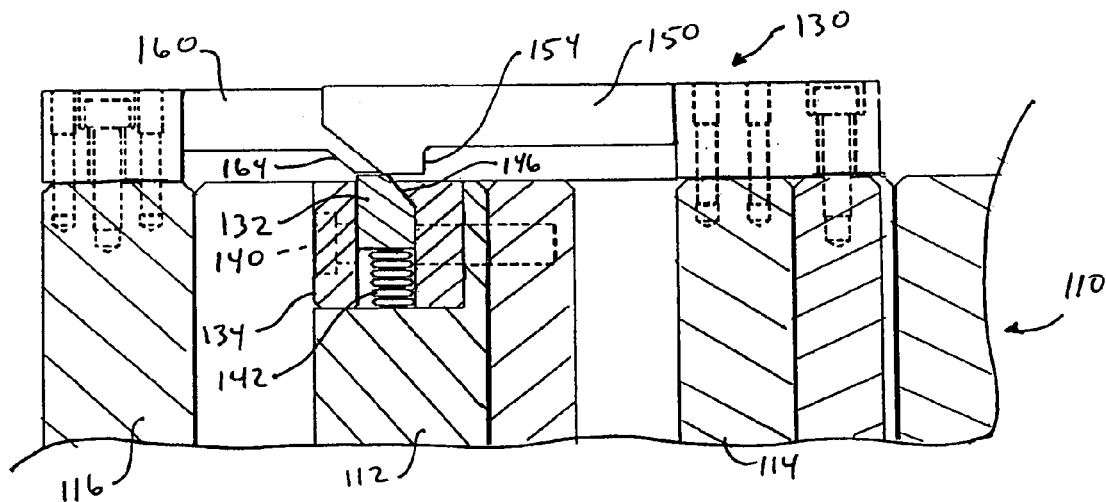

FIGS. 4A and 4B show a partial sectional view of locking device 130, similar in configuration to the locking device 30 shown in FIG. 1, attached to the outer surface of a tripartite mold 110. The locking device 130 includes a wedge block 132 movably mounted to a first mold plate 112 by the fixedly mounted guide housing 134 and pin 140. Spring 142 is disposed between wedge block 132 and the mold plate 112. The wedge block includes a first side wall 144 and an opposing second side wall 146 beveled with respect to the first side wall 144.

A cam bar 150 is fixedly mounted to a second mold plate 114. The cam bar 150 includes a cam surface 154 for engaging with the first side wall 144 of the wedge block 132. As shown in FIG. 4A, when the second mold plate 114 moves in a direction shown by arrow 170, the cam surface 154 engages the wedge block and pulls the first plate 112 to the position shown in FIG. 4B.

Latch bar 160 is fixedly mounted to a third mold plate 116. The mold plate 116 does not move during the molding process, and secures the one or more latch bar 160 in a fixed position. As the cam bar 150 moves the wedge block 132 toward the position shown in FIG. 2, the second side wall 146 of the wedge block 132 is brought into contact with an inclined latch surface 164. The fixed inclined latch surface 164 causes the moving wedge block 132 to compress spring 142, and move into the guide housing 134 as shown in FIG. 4B. Once the wedge block 132 is held within the guide housing 134, the cam bar 150 is released from the wedge block 132. The first plate 112 stops in the position shown in FIG. 4B and the cam bar 150 and second plate 114 continue to the position shown in FIG. 4B. As the mold plates return to the original positions, the cam bar 150 reengages the wedge block 132, which returns to the upwardly extended position shown in FIG. 4A.

FIGS. 5-8 illustrate four stages of an opening of a mold 210 according to one embodiment of this invention. Mold 210 includes two opposing, externally mounted locking devices 230. Each locking device 230 includes a wedge block 232, such as described above, movably mounted to a first mold plate 212 by the fixedly mounted guide housing 234. Spring 242 is disposed between wedge block 232 and the mold plate 212. A cam bar 250, such as described above, is fixedly mounted to a second mold plate 214. In FIGS. 5 and 6, the cam bar 250 is engaged with the wedge block 232, and pulls the first mold plate 212 apart from third mold plate 216.

Latch bars 260 are fixedly mounted to the third mold plate 216. The third mold plate 216 secures the latch bars 260 in a fixed position, at least through the stages shown in FIGS. 5-8. In FIG. 7, the traveling wedge block 232 has reached, and has been depressed by, the latch bars 260. The cam bar 250 is no longer locking the first plate 212 and second plate 214 together, and the second plate 214 extends to the position shown in FIG. 8 to open parting line 215. Pins 225 limit the distance of travel of the first plate 212 and the second plate 214, respectively.

FIGS. 9-12 illustrate four stages of an opening of a mold 310 according to another embodiment of this invention. Mold 310 includes first plate 312 (e.g., a stripper plate), second plate 314, and third plate 316 disposed between first plate 312 and second plate 314. A biased wedge block 332 is fixedly mounted by guide housing 324 to first plate 312. The wedge block 332 includes a first side wall 344 facing in a direction of the second plate 314 and third plate 316. The wedge block 332 further includes an opposing second side wall 346 beveled with respect to the first side wall 344. Two latch bars 360 are fixed to the third plate 316 and each include an inclined latch surface 364 for engaging with the second side wall 346. The two latch bars 360 extend over the wedge block 232 to dispose the inclined surfaces 364 on a side of the wedge block 332 that is opposite the third plate 316.

A cam bar 350, having a general configuration as described with reference to FIG. 2, is fixed to the second plate 314. The cam bar 350 includes a driver bar 390 having a removable cap 392 attached the driver bar 390. The cap 392 forms a cam surface for engaging and exerting force upon the first side wall 344 of the wedge block 332. The cam bar 350, and more particularly the cap 392, contacts the first side wall 344 and drives the wedge block 332 and the first plate 312 away from the third plate 316, as shown in FIG. 10.

Figure 11B:
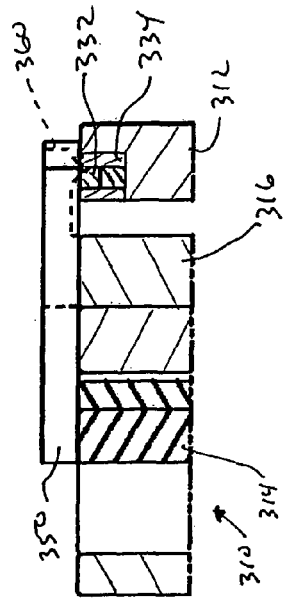
Figure 11A:
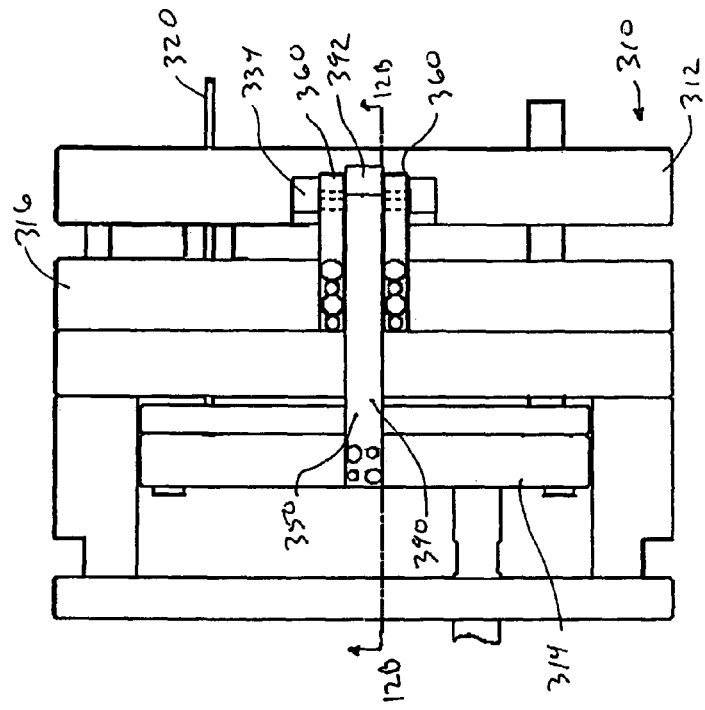
Figure 12B:
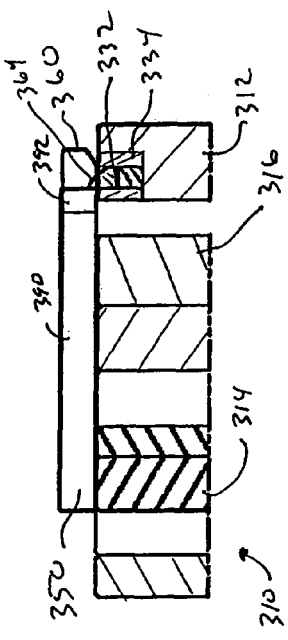
Figure 12A:
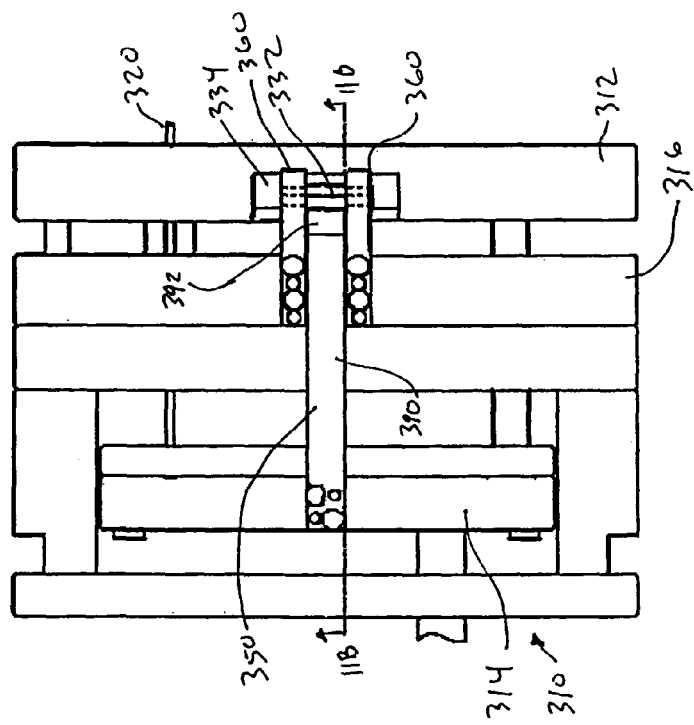

In FIG. 11, the wedge block 332 has contacted the inclined surface 364 of the latch bars 360, and is pushed downward below the cam bar 350 and into the guide housing 334. As the third plate 316 has been fully extended, and the wedge block 332 is no longer extended, the second plate 314 further extends to the position in FIG. 12. The second plate includes an ejector 320 that continues to extend once first plate 312 has stopped. The ejector 320 is particularly useful in assisting in removing plastic molded pieces from the mold after separation.

Thus, the invention provides an external mold plate locking device that provides improved wear and, due in part to the external attachment, easy attachment and replacement. The locking device of this invention also allows for modification to provide locking devices for various molds by substituting one type of cam bar for another type of cam bar.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A locking device for a mold including at least three plates, the locking device comprising:
   a biased wedge block that is movably mountable to a first of the plates, the wedge block including a first side wall and an opposing second side wall beveled with respect to the first side wall;
   a latch bar that is fixedly mountable to a second of the plates and including a latch end for engaging with the second side wall of the wedge block;
   a cam bar that is fixedly mountable to a third of the plates and including a cam end for engaging with the first side wall of the wedge block;
   wherein each of the latch bar and the cam bar is formed of a steel alloy, each of the latch end and the cam end is nitrided or nitride coated, and a remaining portion of each of the latch bar and the cam bar has a lower hardness for machining.

2. The locking device according to claim 1, wherein the steel alloy comprises nickel, chromium, and molybdenum.

3. The locking device according to claim 2, wherein the steel alloy comprises 4340 steel alloy.

4. The locking device according to claim 3, wherein the at least one of the latch end, the cam end, or the wedge block second side wall is titanium nitride coated, chromium nitride coated, or boron nitride coated.

5. The locking device according to claim 1, wherein the wedge block is formed of the steel alloy and the wedge block second side wall is nitrided or nitride coated.

6. The locking device according to claim 1, wherein the cam end comprises a cam surface at least approximately coplanar with the first side wall of the wedge block, and the latch end comprises an inclined latch surface at least approximately coplanar with the second side wall of the wedge block.

7. The locking device according to claim 6, wherein the cam surface comprises a tapered surface and a rounded transition leading into an adjacent surface of the cam bar.

8. The locking device according to claim 1, wherein the cam end comprises a cam surface at least approximately coplanar with the first side wall of the wedge block and the cam surface comprises a rounded transition leading into an adjacent surface of the cam bar.

9. The locking device according to claim 1, wherein the wedge block is biased by springs and housed in a guide plate mountable to the first of the plates.

10. A locking device for a mold including at least three plates, the locking device comprising:
   a biased wedge block that is movably mountable to a first of the plates, the wedge block including a first side wall and an opposing second side wall beveled with respect to the first side wall;
   a cam bar that is fixedly mountable to a second of the plates and including a cam surface for engaging with the first side wall of the wedge block;
   a latch bar that is fixedly mountable to a third of the plates that is disposed between the first and second plates, the latch bar including an inclined latch surface for engaging with the second side wall of the wedge block.

11. The locking device according to claim 10, wherein each of the latch bar and the cam bar is formed of a steel alloy, each of the inclined latch surface and the cam surface is nitrided or nitride coated, and the cam bar contacts the first side wall of the wedge block to drive the wedge block and the first of the plates away from the second of the plates until the inclined latch surface contacts the second side wall of the wedge block and depresses the wedge block below the cam bar.

12. The locking device according to claim 10, wherein the second side wall of the wedge block and the inclined latch surface are at least approximately coplanar.

13. The locking device according to claim 12, further comprising a removable cap attached to the cam bar and including the cam surface.

14. The locking device according to claim 13, wherein both ends of the cam bar can accept the removable cap.

15. The locking device according to claim 13, wherein the removable cap comprises a 4340 steel alloy.

16. The locking device according to claim 10, wherein the latch bar and the cam bar are fixedly connectable to an outer surface of the mold.

17. The locking device according to claim 10, wherein the first of the plates comprises a stripper plate.

18. The locking device according to claim 16, wherein the third of the plates comprises an ejector.

19. The locking device according to claim 10, further comprising a second latch bar that is fixedly connectable to the third of the plates and including an inclined latch surface for engaging with the second side wall of the wedge block, wherein the cam bar is disposed between the latch bar and the second latch bar.

20. The locking device according to claim 10, wherein at least one of the wedge block, the latch bar or the cam bar is formed of a steel alloy, and at least one of the inclined latch surface, the cam surface, or the wedge block second side wall is nitrided or nitride coated.

* * * * *